US010683000B2

(12) United States Patent
Feigel

(10) Patent No.: US 10,683,000 B2
(45) Date of Patent: Jun. 16, 2020

(54) HYDRAULIC SAFETY SYSTEM, BRAKE SYSTEM, AND OPERATING METHOD

(71) Applicant: Continental Teves AG & Co. OHG, Frankfurt (DE)

(72) Inventor: Hans-Jörg Feigel, Rosbach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 126 days.

(21) Appl. No.: 15/483,533

(22) Filed: Apr. 10, 2017

(65) Prior Publication Data
US 2017/0210372 A1 Jul. 27, 2017

Related U.S. Application Data

(63) Continuation of application No. PCT/EP2015/072678, filed on Oct. 1, 2015.

(51) Int. Cl.
*B60T 8/48* (2006.01)
*B60T 17/22* (2006.01)
(Continued)

(52) U.S. Cl.
CPC ............. *B60T 17/227* (2013.01); *B60T 7/04* (2013.01); *B60T 7/042* (2013.01); *B60T 7/12* (2013.01);
(Continued)

(58) Field of Classification Search
CPC .......... B60T 13/745; B60T 8/88; B60T 8/885; B60T 8/94
See application file for complete search history.

(56) References Cited

U.S. PATENT DOCUMENTS 5,713,640 A    2/1998  Feigel et al.
6,082,831 A *  7/2000  Hageman ............... B60T 8/326
                                                    303/115.2
(Continued)

FOREIGN PATENT DOCUMENTS

DE    4401524 A1    8/1995
DE   19538794 A1    4/1997
(Continued)

OTHER PUBLICATIONS

International Search Report and Written Opinion dated Dec. 10, 2015 from corresponding International Patent Application No. PCT/EP2015/072678.
(Continued)

*Primary Examiner* — Bradley T King

(57) ABSTRACT

A safety system brake system comprises a hydraulic pressure-providing device having a pressure chamber connected to at least one brake circuit by a separating valve and into which pressure chamber a piston is moved to build up pressure. The pressure chamber is a two-stage pressure chamber having first and second sub-chambers. During pressure build-up the piston is moved into the first and then the second sub-chamber. The two sub-chamber are hydraulically closed off from each other when the piston is moved a specified distance into the second sub-chamber. A first check valve is connected to the first sub-chamber on a suction side and to a brake fluid reservoir on a blocking side. A second check valve is connected to the second sub-chamber on a suction side, and to the suction side of the first check valve on the blocking side.

15 Claims, 2 Drawing Sheets

(51) Int. Cl.
*B60T 7/04* (2006.01)
*B60T 13/68* (2006.01)
*B60T 17/06* (2006.01)
*B60T 7/12* (2006.01)
*B60T 13/74* (2006.01)
*B60T 13/66* (2006.01)
*B60T 8/40* (2006.01)
*B60T 13/14* (2006.01)

(52) U.S. Cl.
CPC .......... *B60T 8/4018* (2013.01); *B60T 13/145* (2013.01); *B60T 13/66* (2013.01); *B60T 13/68* (2013.01); *B60T 13/686* (2013.01); *B60T 13/74* (2013.01); *B60T 17/06* (2013.01); *B60T 17/221* (2013.01); *B60T 17/223* (2013.01); *B60T 8/4081* (2013.01)

(56) References Cited

U.S. PATENT DOCUMENTS

| | | | |
|---|---|---|---|
| 9,868,426 B2 * | 1/2018 | Feigel | B60T 8/4018 |
| 9,914,443 B2 * | 3/2018 | Masur | B60T 13/662 |
| 2002/0084693 A1 * | 7/2002 | Isono | B60T 8/4081 |
| | | | 303/113.1 |
| 2003/0020327 A1 | 1/2003 | Isono et al. | |
| 2009/0273230 A1 * | 11/2009 | Wang | B60K 6/48 |
| | | | 303/122.09 |
| 2013/0147259 A1 | 6/2013 | Linkenbach | |
| 2016/0016571 A1 * | 1/2016 | Ganzel | B60T 13/168 |
| | | | 303/66 |
| 2016/0031426 A1 * | 2/2016 | Feigel | B60T 8/4018 |
| | | | 303/115.2 |
| 2016/0311422 A1 * | 10/2016 | van Zanten | G01M 3/2869 |
| 2017/0327098 A1 * | 11/2017 | Leiber | B60T 7/042 |

FOREIGN PATENT DOCUMENTS

| | | |
|---|---|---|
| DE | 19626926 A1 | 1/1998 |
| DE | 102011122776 A1 | 1/2013 |
| DE | 102012212836 A1 | 2/2013 |
| DE | 102012219996 A1 | 5/2014 |
| DE | 102013216423 A1 | 9/2014 |
| DE | 102013224870 A1 | 9/2014 |
| JP | H09507663 A | 8/1997 |
| JP | 2003034244 A | 2/2003 |
| JP | 2013034224 A | 2/2013 |
| JP | H09T663 | 2/2013 |
| KR | 1020130102059 A | 9/2013 |
| WO | WO2011029812 A1 | 3/2011 |

OTHER PUBLICATIONS

German Search Report dated Jun. 26, 2015 for corresponding German Patent Application No. 10 2014 220 432.1.

* cited by examiner

HYDRAULIC SAFETY SYSTEM, BRAKE SYSTEM, AND OPERATING METHOD

CROSS-REFERENCE TO RELATED APPLICATION

This application claims the benefit of PCT Application PCT/EP2015/072678, filed Oct. 1, 2015, which claims priority to German Application DE 10 2014 220 432.1, filed Oct. 9, 2014. The disclosures of the above applications are incorporated herein by reference.

TECHNICAL FIELD

The invention relates to a hydraulic safety system for an electrohydraulic brake system. It furthermore relates to a brake system having a safety system.

BACKGROUND

"Brake-by-wire" brake systems are being used to an ever-increasing extent in motor vehicle engineering. In addition to a brake master cylinder that can be actuated by the vehicle driver, brake systems of this kind often include a pressure supply device which can be controlled electrically ("by-wire") and by means of which actuation of the wheel brakes is performed in the "brake-by-wire" operating mode.

In these brake systems, in particular electrohydraulic brake systems featuring the "brake-by-wire" operating mode, the driver is isolated from direct access to the brakes. When the pedal is actuated, a pedal decoupling unit and a simulator are usually actuated, wherein the braking requirement of the driver is detected by a sensor system. The pedal simulator, which is usually designed as a brake master cylinder, serves to give the driver a brake pedal feel which is as familiar and comfortable as possible. The brake requirement detected leads to a determination of a setpoint braking torque, from which the setpoint brake pressure for the brakes is then determined. The brake pressure is then built up actively in the brakes by a pressure supply device. The actual braking is thus accomplished by active pressure buildup in the brake circuits with the aid of a pressure supply device, which is controlled by an open-loop and closed-loop control unit. By means of the hydraulic decoupling of brake pedal actuation from the pressure buildup, many functionalities, such as ABS, ESC, TCS, hill start assistance etc. can be implemented in a manner that is convenient for the driver in brake systems of this kind.

In brake systems of this kind, a hydraulic fallback level is usually provided, by means of which the driver can brake the vehicle or bring it to a halt by muscle power when the brake pedal is actuated if the "by-wire" operating mode fails or is faulty. Whereas the above-described hydraulic decoupling between brake pedal actuation and brake pressure buildup is performed by a pedal decoupling unit in the normal mode, this decoupling is canceled at the fallback level, thus allowing the driver to move brake fluid into the brake circuits directly.

The pressure supply device in brake systems described above is also referred to as an actuator or hydraulic actuator. In particular, actuators are designed as linear actuators or linear units, in which a piston is moved axially into a hydraulic pressure chamber installed in series with a rotation-translation mechanism in order to build up pressure.

WO 2011/029812 A1 discloses a "brake-by-wire" brake system having a brake master cylinder that can be actuated by means of a brake pedal, a travel simulator and a pressure supply device. In a "brake-by-wire" operating mode, the wheel brakes are supplied with pressure by the pressure supply device. In a fallback operating mode, the wheel brakes are supplied with pressure by means of the brake master cylinder, which can be actuated by means of the brake pedal.

To draw in additional brake fluid in known brake systems, the pressure supply device is usually connected to a reservoir by a hydraulic line, into which a check valve is inserted. The suction side of the check valve is hydraulically connected to the reservoir, and the blocking side of the check valve is hydraulically connected to the pressure supply device.

A switch is made to the fallback level if a pressure buildup is no longer possible with the aid of the pressure supply device. This is the case, inter alia, when the check valve connecting the pressure supply device to the reservoir no longer shuts off reliably, with the result that a pressure buildup is no longer reliably possible.

During automated driving, in which the vehicle drives autonomously, it must be assumed that there are long periods when the driver is not in a position to perform braking at the fallback level if this check valve fails.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

It is therefore an underlying object of the invention to enable active braking operations with the aid of the pressure supply device, even if the check valve fails.

In respect of the hydraulic safety system, this may be achieved, by a hydraulic pressure supply device that has a pressure chamber, which can be connected to at least one brake circuit by means of at least one separating valve and into which a piston is moved to build up pressure, and having a reservoir for brake fluid, wherein the pressure chamber is of two-stage design with a first subchamber and a second subchamber, wherein during the pressure buildup the piston is first moved into the first subchamber and then into the second subchamber, wherein the two chambers are hydraulically closed off from each other when the piston is moved a specified distance into the second subchamber, and wherein the suction side of a first check valve is hydraulically connected to the first subchamber and the blocking side thereof is hydraulically connected to the reservoir, and wherein the suction side of a second check valve is connected to the second subchamber, and wherein the blocking side of the second check valve is connected to the suction side of the first check valve.

It is of essential importance for the correct functioning of a brake system that is being operated in the "brake-by-wire" operating mode that the pressure supply device can build up brake pressure at any time as required. To ensure that there is always sufficient brake fluid available, it must be possible to draw additional brake fluid from the reservoir when required. A check valve in the corresponding hydraulic line used for drawing in additional fluid must reliably prevent brake fluid from flowing back into the reservoir via this line during the pressure buildup. If the check valve fails partially or completely or if it can no longer perform this task, it is usually necessary to switch to the fallback level, in which the driver obtains direct access to the wheel brakes and can build up brake pressure by muscle power.

However, valuable time can pass during this switchover in dangerous situations since the driver must recognize that he must actuate the brake pedal more strongly than before and that the brake pedal travel and pedal feel have changed. Thus, it would be desirable if an active pressure buildup were still possible, even after the failure of the check valve.

This can be achieved if the pressure chamber is of two-part construction with two subchambers, from each of which a hydraulic line leads to the reservoir, wherein the two chambers are sealed off hydraulically from one another after a predetermined travel of the piston, and wherein a check valve is inserted in each of the two lines, with the special feature that the blocking side of one check valve is connected to the suction side of the other check valve. This construction allows the active pressure buildup by the pressure supply device, even if one of the two valves has failed, thus making it unnecessary to switch immediately to the conventional fallback level. In this way, an active fallback level or intermediate fallback level is provided.

A sealing element is provided, which seals off the first subchamber and the second subchamber hydraulically from one another in a state in which the piston has entered the second subchamber. The sealing element is preferably secured in the region of the second chamber.

The cross section of the second subchamber may be smaller than the cross section of the first subchamber. In the case of an embodiment of this kind, the piston of the pressure supply device is preferably designed as a stepped piston, having a first step, the cross section of which corresponds to that of the first subchamber, and a second step adjoining the first, the cross section of which corresponds to that of the second subchamber and which enters the second subchamber.

The first subchamber is connected to the reservoir by a hydraulic line, into which a connecting valve or auxiliary valve is inserted.

The connecting valve is electrically switchable. As an alternative, the connecting valve can also be of hydraulically switchable design.

In respect of the brake system, the abovementioned is achieved by a brake master cylinder, which can be actuated by means of a brake pedal and the at least one pressure chamber of which is connected, in particular separably, to wheel brakes assigned to brake circuits, having a pressure control valve arrangement for closed-loop and/or open-loop control of a wheel brake pressure input at one wheel brake, having a hydraulic safety system described above and having an electronic open-loop and closed-loop control unit for controlling the pressure supply device of the safety system and/or of the pressure valve arrangement.

In one embodiment of the method the leaktightness of the first check valve is checked, preferably cyclically, by moving the piston into the second subchamber until the two subchambers are hydraulically separated, and wherein the connecting valve is opened and the pressure in the line connecting the pressure supply device to the at least one brake circuit and/or the power consumption of an electric motor of the pressure supply device is/are monitored.

During the movement of the piston, the leaktightness of the second check valve is advantageously checked by observing the pressure established in the hydraulic chamber (normally during each actuation). If there is a pressure reduction without further movement of the piston, a leak can be assumed.

A switch is made to a hydraulic fallback level if the failure of both check valves is detected, wherein the pressure supply device is hydraulically separated from the brake circuits and the brake master cylinder is hydraulically connected to the brake circuits.

The auxiliary system described provides an additional fallback level, in which active pressure buildup is still possible, thereby increasing the safety of the driver since he does not have to actively build up brake pressure immediately by muscle power. As a result, the vehicle can be braked rapidly, especially in critical situations, since the response time of the driver is not included, particularly during automated driving but also on vehicles that are actively controlled by the driver and have an electrohydraulic brake system operated in the brake-by-wire mode.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

An illustrative embodiment of the invention is explained in greater detail by means of a drawing. In the drawing, which is highly schematic.

DETAILED DESCRIPTION

Identical parts are provided with the same reference signs in both figures.

Figure 1:
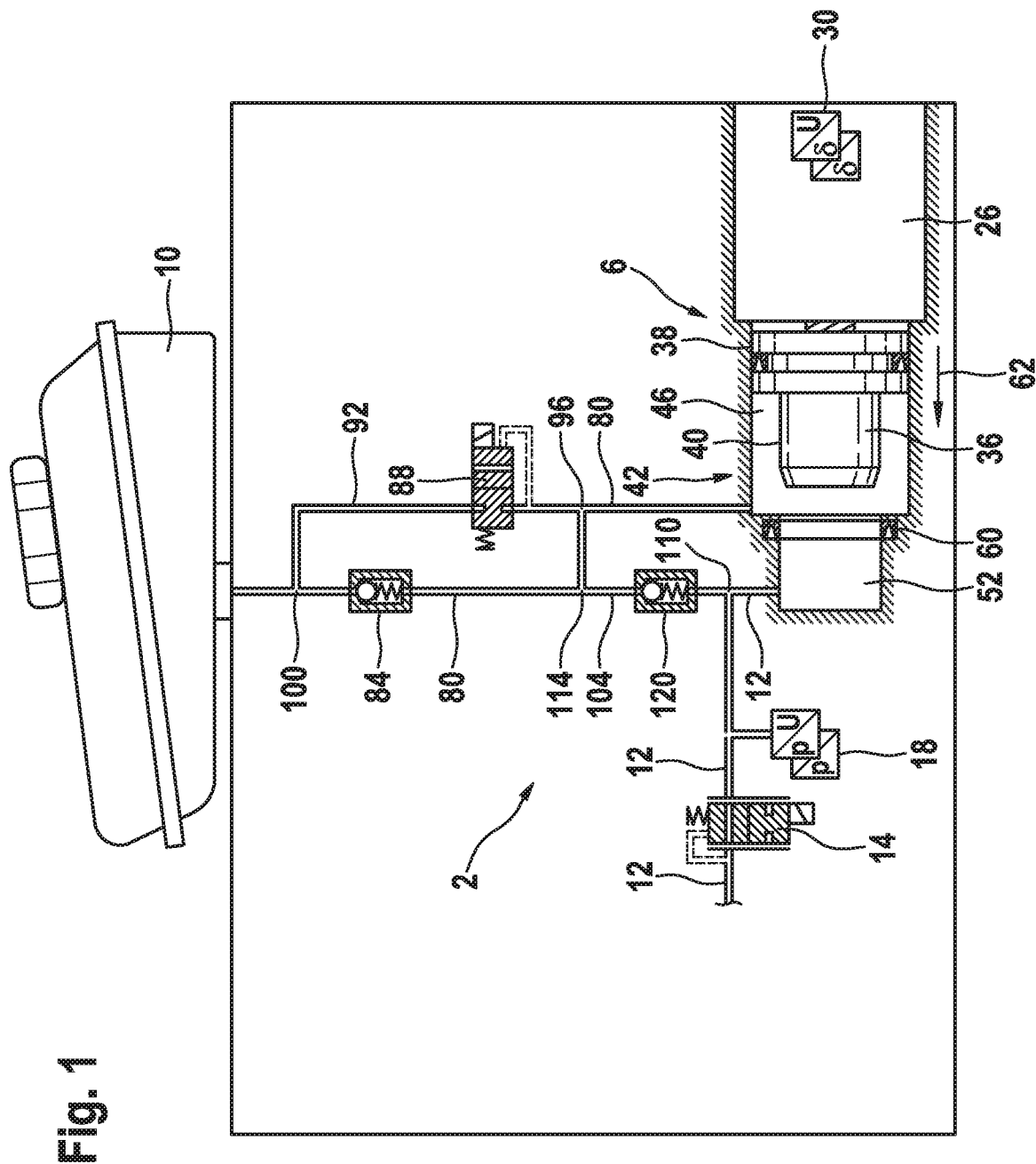
FIG. 1 shows a hydraulic safety system in a first preferred embodiment.
Figure 1:
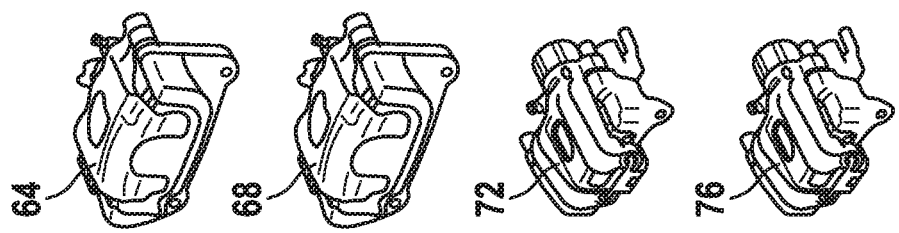

An electrohydraulic safety system 2 or auxiliary system shown in FIG. 1 comprises a pressure supply device 6 and a reservoir 10 for brake fluid. The pressure supply device 6 can be connected to at least one brake circuit via a hydraulic line 12. An electrically actuable separating valve 14 is inserted into the hydraulic line 12. The pressure in the hydraulic line 12 can be measured by means of a pressure sensor 18 of redundant design.

The pressure supply device 6 comprises an electromechanical actuator, which comprises an electric motor 26, the rotor position of which is determined by a rotor position sensor 30 of redundant design, which detects the angle of the rotor. The rotation of the rotor is converted by a rotation-translation mechanism, which is designed as a ball screw in the present case, into the axial movement of a piston 36. For active pressure buildup, the piston 36 is moved into a pressure chamber 42 of the pressure supply device 6. The pressure chamber 42 is of stepped construction and comprises a first subchamber 46 and a second subchamber adjoining the latter. To build up pressure, the piston 36 is moved in a stroke direction 62 and, in the process, first of all enters the first subchamber 46 and then, after a further travel, the second subchamber 52.

Provided in the second subchamber 52 is a sealing element 60, which seals off the first subchamber 46 and the second subchamber 52 from one another in a state in which the piston 36 has entered the second subchamber. Both subchambers 46, 52 and the piston 36 have substantially a round cross section, wherein the cross section of the second subchamber 52 is smaller than the cross section of the first subchamber 46. The piston 36 is of two-stage construction with a first stage 38, the external cross section of which corresponds to the internal cross section of the first subchamber 46, and a second stage adjoining the first stage, the external cross section of which corresponds to the internal cross section of the second subchamber 52. In this way, brake fluid can be displaced from the first subchamber 36 as the piston 36 is moved in stroke direction 62 and, as soon as the piston 36 enters the second subchamber 52, brake fluid can be displaced from the second subchamber 52, leading to a pressure buildup in the wheel brakes 64, 68, 72, 76.

The safety system 2 is preferably used in a brake-by-wire brake system, in which brake pressure is built up actively by the pressure supply device 6. In the present case, the brake system has two front wheel brakes 64, 68 and two rear wheel brakes 72, 76.

The safety system 2 is suitable, especially in the case of automated driving, for continuing to allow an active pressure buildup with the aid of the pressure supply device 6, even if a check valve between the pressure supply device 6 and the reservoir 10 fails. On vehicles which drive to a large extent autonomously and in which the driver does not actively steer, a relatively long delay must be expected before the driver can actively perform a braking process on a fallback level in the event of a malfunction if the active pressure buildup fails. In the case of nonautomatic driving too, however, advantages result from the fact that, as it were, a fallback level with active pressure is provided, with the result that an active pressure buildup is possible, even if a check valve fails.

The first subchamber 46 is connected to the reservoir 10 by a first hydraulic reservoir line 80. Inserted into the reservoir line 80 is a first check valve 84, the suction side of which is connected to the reservoir 10. Connected in parallel with the check valve 84 is an auxiliary valve or connecting valve 88, which is closed when deenergized and which is switched mechanically. The connecting valve 88 is arranged in a hydraulic auxiliary line 92, which branches off from the reservoir line 80 at a junction 96 and reenters said line at a junction 100.

A second hydraulic reservoir line 104 branches off from line 12 at a junction and opens into the first reservoir line 80 at a junction 114. Inserted into the second hydraulic reservoir line 104 is a second check valve 120, the blocking side of which is hydraulically connected to the suction side of the first check valve 84.

Two scenarios are discussed below, in which one of the two check valves 84, 120 fails in each case. If the first check valve 84 fails, it is no longer possible to build up a hydraulic pressure in the first subchamber 46. However, the brake system does not have to switch to a hydraulic fallback level in which the driver builds up brake pressure by muscle power in actuating the brake pedal. As soon as the piston 36 enters the second subchamber 52, which is sealed off from the first subchamber by the sealing element 60, which is arranged in the second subchamber 52, pressure can be built up again in the second subchamber—assuming the functioning of the second check valve 120.

If the second check valve 120 fails, i.e. no longer blocks the flow of brake fluid from the pressure supply device 6 into the reservoir 10, pressure can nevertheless be built up when the piston 36 is in the first 46 or the second subchamber 52 since the blocking side of the second check valve 120 is connected to the suction side of the first check valve 84 via lines 104 and 80.

Thus, if one of the two check valves 84, 120 fails, an active pressure buildup is therefore still possible. Only in the very improbable case where both check valves 84, 120 fail is it necessary to switch to the hydraulic fallback level.

Figure 2:
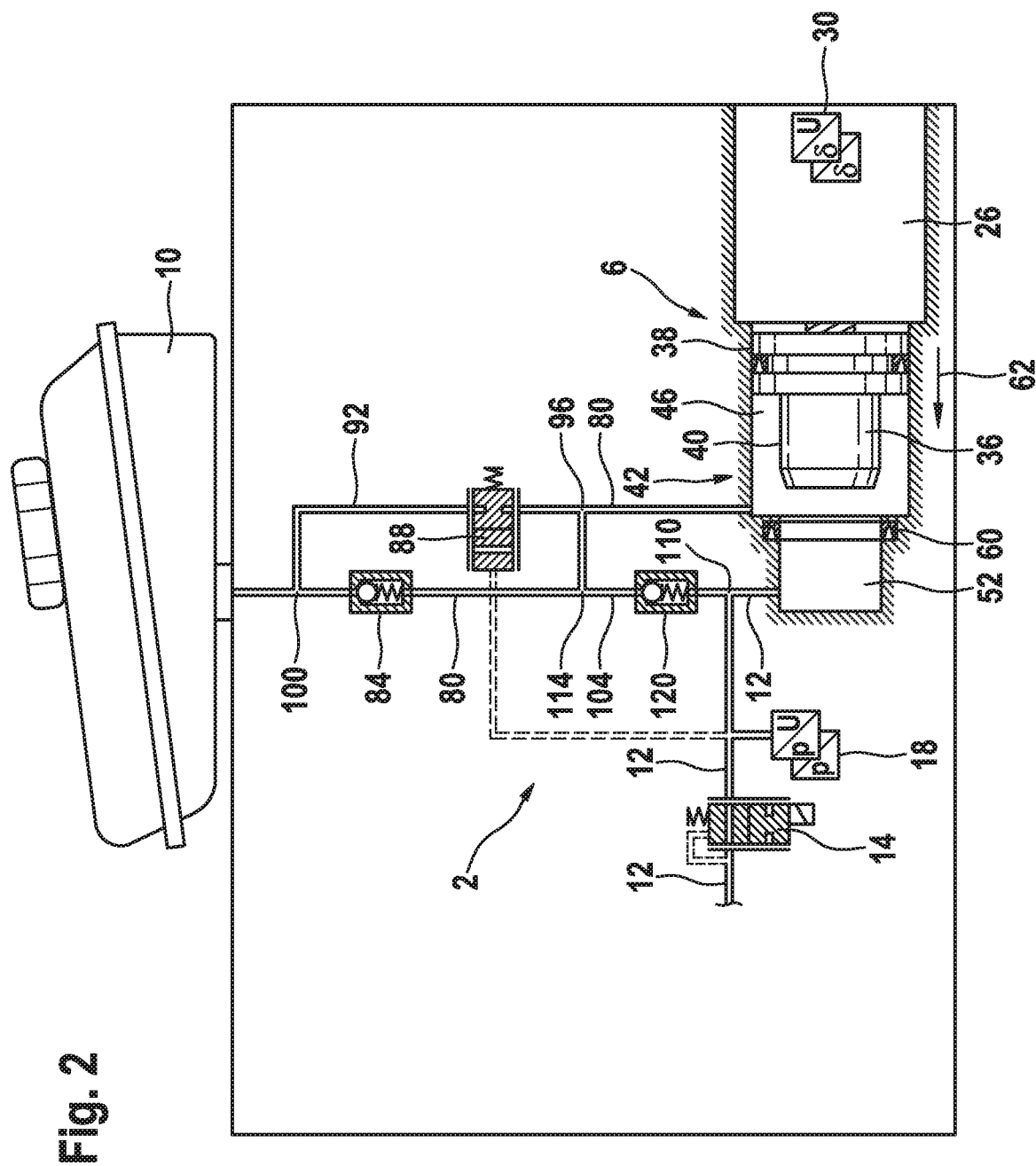
FIG. 2 shows a hydraulic safety system in a second preferred embodiment.

A safety system 2 is shown in a second preferred embodiment in FIG. 2. In the safety system 2 shown in FIG. 2, the auxiliary valve 88, which is closed when deenergized, is switched electrically in accordance with a signal of the pressure sensor 18 and/or of the motor position sensor 30.

The functioning of the two check valves 84, 120 can be checked as follows. The leaktightness of the second check valve 120 is checked—preferably cyclically—by moving the piston 36 forward with the aid of the electric motor 30 until the pressure chamber 42 has been divided into two subchambers 46, 52. After the opening of the connecting valve or auxiliary valve 88, the leaktightness of the first check valve can then be checked with the aid of the pressure sensor 18 or by means of the motor current consumption. The leaktightness of the first check valve 84 is checked during each actuation of the hydraulic piston 36.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A hydraulic safety system for an electrohydraulic brake system comprising:
   a hydraulic pressure supply device that defines a pressure chamber, the pressure chamber is connected to at least one brake circuit by at least one separating valve and into which a piston is moved to build up pressure;
   wherein the pressure chamber is of two-stage design with a first subchamber and a second subchamber;
   wherein the piston is first moveable in the first subchamber and then into the second subchamber during the pressure buildup and the two chambers are hydraulically closed off from each other when the piston is moved a specified distance into the second subchamber;
   a reservoir for brake fluid;
   a first check valve defining a suction side hydraulically connected to the first subchamber and a blocking side hydraulically connected to the reservoir; and
   a second check valve defining a second suction side connected to the second subchamber and a second blocking side connected to the suction side of the first check valve.

2. The hydraulic safety system of claim 1, wherein a sealing element is provided, which hydraulically seals off the first and the second subchamber from one another when the piston has entered the second subchamber.

3. The hydraulic safety system of claim 1, wherein a second subchamber cross section of the second subchamber is smaller than a first subchamber cross section of the first subchamber.

4. The hydraulic safety system of claim 1, wherein the first subchamber is connected to the reservoir by a hydraulic line into which a connecting valve is inserted.

5. The hydraulic safety system of claim 4, wherein the connecting valve is electrically switchable.

6. The hydraulic safety system of claim 4, wherein the connecting valve is hydraulically switchable.

7. A brake system comprising:
- a brake master cylinder, which can be actuated by a brake pedal;
- at least one pressure chamber of which is separably connected to wheel brakes assigned to brake circuits, having a pressure control valve arrangement for one of closed-loop and open-loop control of a wheel brake pressure input at one wheel brake;
- a hydraulic pressure supply device that defines the at least one pressure chamber, the at least one pressure chamber is connected to the brake circuits by at least one separating valve and into which a piston is moved to build up pressure;
- wherein the at least one pressure chamber is of two-stage design with a first subchamber and a second subchamber;
- wherein the piston is first moveable in the first subchamber and then into the second subchamber during the pressure buildup and the first and second subchambers are hydraulically closed off from each other when the piston is moved a specified distance into the second subchamber;
- a reservoir for brake fluid;
- a first check valve defining a suction side hydraulically connected to the first subchamber and a blocking side hydraulically connected to the reservoir;
- a second check valve defining a second suction side connected to the second subchamber and a second blocking side connected to the suction side of the first check valve; and
- having an electronic open-loop and closed-loop control unit for controlling one of the hydraulic pressure supply device and of the pressure control valve arrangement.

8. The brake system of claim 7, wherein a sealing element is provided, which hydraulically seals off the first and the second subchamber from one another when the piston has entered the second subchamber.

9. The brake system of claim 7, wherein a second subchamber cross section of the second subchamber is smaller than a first subchamber cross section of the first subchamber.

10. The brake system of claim 7, wherein the first subchamber is connected to the reservoir by a hydraulic line into which a connecting valve is inserted.

11. The brake system of claim 10, wherein the connecting valve is electrically switchable.

12. The brake system of claim 10, wherein the connecting valve is hydraulically switchable.

13. A method utilizing the brake system as recited in claim 7, the method comprising:
- cyclically checking a sealing ability of the first check valve by moving the piston from the first subchamber into the second subchamber until the first and second subchambers are hydraulically separated;
- opening a connecting valve; and
- monitoring at least one pressure in a line connecting the hydraulic pressure supply device to at least one brake circuit and power consumption of an electric motor of the hydraulic pressure supply device.

14. The method of claim 13, further comprising checking the second check valve for sealing ability every time the piston is moved.

15. The method of claim 14, further comprising switching to a hydraulic fallback level when failure of both first and second check valves is detected, and wherein during the hydraulic fallback level the pressure supply device is hydraulically separated from at least one brake circuit and the brake master cylinder is hydraulically connected to the at least one brake circuit.

* * * * *